(12) United States Patent
Morgenbrod et al.

(10) Patent No.: US 12,391,581 B2
(45) Date of Patent: Aug. 19, 2025

(54) APPARATUS FOR STERILIZING A LIQUID

(71) Applicant: OSRAM GMBH, Munich (DE)

(72) Inventors: Nico Morgenbrod, Bernau (DE);
Tobias Gleitsmann, Michendorf (DE);
Andreas Lovich, Augsburg (DE);
Norbert Magg, Berlin (DE)

(73) Assignee: OSRAM GmbH, Munich (DE)

( * ) Notice: Subject to any disclaimer, the term of this patent is extended or adjusted under 35 U.S.C. 154(b) by 489 days.

(21) Appl. No.: 17/724,184

(22) Filed: Apr. 19, 2022

(65) Prior Publication Data

US 2022/0340450 A1 Oct. 27, 2022

(30) Foreign Application Priority Data

Apr. 23, 2021 (DE) .................. 10 2021 204 080.2

(51) Int. Cl.
*C02F 1/32* (2023.01)
*B05B 1/12* (2006.01)
*B05B 15/50* (2018.01)
*C02F 1/00* (2023.01)

(52) U.S. Cl.
CPC ............... *C02F 1/325* (2013.01); *B05B 1/12* (2013.01); *B05B 15/50* (2018.02); *C02F 1/008* (2013.01); *C02F 2201/3222* (2013.01); *C02F 2209/03* (2013.01); *C02F 2209/11* (2013.01); *C02F 2303/04* (2013.01)

(58) Field of Classification Search
None
See application file for complete search history.

(56) References Cited

U.S. PATENT DOCUMENTS

2017/0225984 A1\* 8/2017 Hayden .................. C02F 1/325
2018/0362367 A1\* 12/2018 Mahdjoubi Namin .....................
E03B 7/074

FOREIGN PATENT DOCUMENTS

DE 19722920 A1 12/1998
JP 2006239478 A 9/2006

\* cited by examiner

Primary Examiner — Eliza W Osenbaugh-Stewart
(74) Attorney, Agent, or Firm — ArentFox Schiff LLP

(57) ABSTRACT

An apparatus for sterilizing a liquid comprises a container having an inlet, an outlet and an interior with an outer wall, and a light source adapted to emit radiation in the ultraviolet wavelength range through the outer wall into the interior, the outer wall being partially transparent. The inlet comprises an opening, positioned in relation to the outer wall of the interior and the light source in order, when a pressure is exerted on the liquid to be admitted through the opening and to be sterilized, to form a liquid jet directed onto the outer wall in a region of the light source, above the latter, and/or to form a liquid film there. The liquid jet impinging on the outer wall may flow down thereon as a thin liquid film in front of the light source and thereby effectively sterilized even with a low penetration depth of the UV radiation.

18 Claims, 5 Drawing Sheets

APPARATUS FOR STERILIZING A LIQUID

This application claims priority to German Patent Application No. 10 2021 204 080.2, filed Apr. 23, 2021, the disclosure of which is hereby incorporated by reference herein in its entirety.

TECHNICAL FIELD

The present invention relates to an apparatus for sterilizing a liquid, which comprises a container that is intended to receive the liquid and has an outer wall enclosing an interior, and at least one light source which is configured to emit light with wavelengths in the range of UV radiation, in particular UV-C radiation, through the outer wall of the container into an interior of the container in order to irradiate liquid received therein. Such apparatuses are also referred to as UV reactors.

PRIOR ART

It is known to use UV reactors in order to treat drinking water or for the sterilization of service water in dishwashers, etc. By the UV radiation acting on the liquid in question, microorganisms, in particular viruses, bacteria or fungi, contained therein can be inactivated. By the UV radiation, the corresponding germs are in this case either directly killed or at least damaged in respect of their DNA or RNA and therefore prevented from replicating. Particularly effective in this case is found to be the radiation in the wavelength range of from 200 nm to 280 nm, which according to DIN 5031-7 is also referred to as far-UV radiation, as well as the adjacent range of from 100 nm to 200 nm, which is correspondingly referred to as vacuum-UV radiation. Furthermore, UV radiation in the range of from 249 nm to 338 nm is effective against bacteria on biofilms, the wavelength range of between 292 nm and 306 nm being distinguished by a particularly high efficacy, with an efficacy maximum at 296 nm. Biofilms are included here under the category of non-liquid fluids. Radiation with this wavelength is absorbed in the Earth's atmosphere, so that most microorganisms have not formed resistances against it. DNA absorbs radiation particularly at a maximum which lies between about 260 and 270 nm. The aforementioned wavelength ranges are combined as UV-C radiation and are predominantly used in UV reactors. For the purposes of this application, the range of from 10 nm to 121 nm (extreme ultraviolet) is also included by the term UV-C radiation.

Conventionally, in particular low-pressure mercury lamps with characteristic emission at about 253.7 nm have previously been used for this purpose. These have certain disadvantages, however, for example increased degradation within the first 500 operating hours and an average lifetime of only 8000 operating hours, as well as the requirement of an AC voltage source for operation or increased disposal costs because of the mercury used, as well as also a risk of breakage in respect of the lamps used. Furthermore, low-pressure mercury lamps have the disadvantage of needing a comparatively large installation space and the disposal of the phosphor is problematic because of the use of mercury. In addition, low-pressure mercury lamps have significant restrictions when involved with applications in which rapid ON/OFF switching cycles are necessary.

In contrast, LEDs emitting radiation in the UV-C wavelength range have recently also been used increasingly for the sterilization of fluids. Although the service lives may be more than 10 000 hours, the so-called wall plug efficiency (radiation emitted per unit of energy used) of the LEDs in the UV-C range is currently still less than those of the low-pressure mercury lamps or other UV lamps (for example about 3% to 6% as opposed e.g. to 25% to 30%), the efficiency decreasing even more dramatically toward ever shorter wavelengths, even though advances continue to be achieved.

One problem, particularly in the disinfection of extremely turbid liquids, for instance in dishwashers, etc., is the significant attenuation of the UV radiation used for the disinfection in the liquid to be disinfected. Even regular drinking water can lead to a significant reduction in the transmission as a function of the layer thickness. In the case of even more strongly polluted wastewater, it is to be expected that the radiation intensity will already have fallen to 10% of the initial value with a layer thickness of 5 mm.

In the prior art, it is therefore proposed on the one hand to make the radiation power so high that a sufficient reduction of the bioburden is achieved in all regions to be disinfected of the liquid, for example a reduction of the colony forming units (CFU) by a factor of less than $10^{-5}$ or even less than $10^{-6}$.

With this approach, however, an energy efficiency of the system is reduced because of UV overdosage in a predominant part of the irradiated region. If LEDs are used as UV light sources, on the other hand, this approach may scarcely be envisioned anyway because of the limited maximum amounts of UV radiation.

As an alternative, it has been proposed to reduce the thickness of the liquid layer to be irradiated through, for example by reducing the reactor diameter or by suitably defining a flat liquid level on a surface to be irradiated. This, however, requires an increase in the flow rate in order not to suffer from losses of throughput per unit time. The action time is reduced in this way, however, which in turn leads to insufficient sterilization.

Document U.S. Pat. No. 5,626,768 A discloses an apparatus for inactivating or killing bacteria in an opaque liquid by means of UV radiation. The apparatus comprises a cuboid box having an inlet and an outlet, as well as 8 planar excimer radiators arranged mutually parallel therein at a spacing of 2 cm and having dimensions of 30 inches (about 76.2 cm) in length by 30 inches (about 76.2 cm) in width by 0.5 inches (about 1.27 cm) in thickness. The excimer radiators are fixed alternately on mutually opposite walls of the box so that a flow path, referred to in the document as "serpentine", is formed between them with a total length of 240 inches (about 6.09 m), which is irradiated on both sides by the excimer radiators with UV radiation having a wavelength of 282 nm with a radiant exitance of 125 mW/cm². With the spacing given, this radiation is not sufficient to fully penetrate the opaque liquid. However, the flow speed is set sufficiently high to cause mixing on the basis of turbulence thereby formed so that, over the total length of the flow route, all bacteria come close to the surface of the excimer radiators and are killed. Furthermore, single or multiple recirculation from the outlet back to the inlet is provided in order to further improve the disinfection outcome.

Document JP 2000-288559 A discloses a wastewater treatment apparatus. Wastewater, to which hydrogen peroxide is added, is supplied to an overflow container by means of a pump. Via an overflow, the wastewater reaches a flat, substantially horizontal, laterally bounded flow route surface with a length of 30 cm and a width of 20 cm, on which the wastewater spreads out and forms an approximately 10 mm thick liquid film that moves in the direction of a collection container. The thickness of the liquid film is controlled by means of the delivery into and out from the overflow container. A number of UV lamps are positioned above the flow route surface and a domed reflector is positioned above the latter, which together emit UV radiation with a wavelength of less than 254 nm with a radiant exitance of 123 W/m² in the direction of the liquid film. Because of the UV radiation, the hydrogen peroxide reacts to form hydroxyl radicals which in turn aggressively oxidize organic substances in the wastewater.

Document U.S. Pat. No. 5,069,885 A discloses an apparatus for photocatalytically purifying liquids, which may in particular be laden with pollutants such as trihalomethanes, polychlorinated biphenyls (PCB), pesticides, benzene derivatives. The apparatus comprises a cylindrical casing having an inlet and an outlet, and a spiral coil which is introduced into the interior of the casing, externally ends in a leaktight fashion with the casing wall and internally ends with a transparent sleeve, which extends along the cylinder axis and in which a UV lamp is arranged. The spiral coil forms a helical channel in the casing, which winds around the sleeve with the UV lamp from the inlet to the outlet and is internally irradiated by the UV lamp. The surface of the substrate of the spiral coil is coated with photoreactive material, for instance titanium oxide. The irradiation with UV light leads to the destruction of organic components in the liquid, which reach the surface by turbulence during the through-flow.

In the proposals above, attempts are made to expose the liquid to be disinfected as a quasi-two-dimensional layer to the UV radiation. In this case, however, a disadvantageous effect is still that the occasionally bulky, sometimes even open constructions hinder miniaturization and at the same time continue to suffer from low through-flow quantities. Use, for example, in modern automatic washing machines or dishwashers is therefore extremely difficult.

DESCRIPTION OF THE INVENTION

It is therefore an object of the invention to provide an apparatus for sterilizing a liquid, with which a high throughput of sufficiently disinfected liquid is achieved with little installation space. It is also an object to provide a corresponding method.

The object is achieved by an apparatus for sterilizing a liquid having the features of patent claim 1. The dependent claims relate to advantageous refinements of the apparatus according to the invention.

The starting point is an apparatus for sterilizing a liquid, which comprises a container having an inlet, an outlet and an interior with an outer wall. The apparatus furthermore comprises at least one light source which is adapted to emit radiation in the ultraviolet wavelength range, in particular UV-C radiation, through the outer wall or from a position on the outer wall into the interior, depending on whether the at least one light source is placed behind or in front of the outer wall as seen from the interior. The at least one light source may also be integrated in the outer wall. In the first case, the outer wall of the interior may for this purpose be configured to be at least partially transparent. It may, in particular, be a UV-C reactor.

The inlet comprises at least one opening, which is positioned and aligned in relation to the outer wall of the interior and the at least one light source in order, when a pressure is exerted on the liquid to be admitted through the at least one opening and to be sterilized, to form a liquid jet directed onto the outer wall in a region of the at least one light source and/or above the latter, and/or to form a liquid film there.

According to particular refinements, the opening may be configured to form the liquid jet directed onto the outer wall in such a way that it can impinge on the outer wall as a focused or fanned-out jet and can flow down thereon as a thin liquid film in front of the at least one light source, or as a finely distributed spray mist it fills a volume adjacent to the region of the at least one light source. It is not even in this case necessary for the liquid projected or sprayed onto the outer wall to flow down fully on the outer wall, for example under the effect of adhesion and gravity. Liquid rebounding by splashes and drops falling down are thoroughly possible. Since irradiation with UV-C radiation may also take place on the way from the opening to the outer wall, the effect may in this case likewise take place according to exemplary embodiments. This applies particularly for the case of the fine spray mist. According to one refinement of the apparatus for sterilizing a liquid, the at least one opening is respectively formed as a nozzle.

Lying opposite of opening and outer wall in the region of the at least one light source and/or above the latter involves the direct (linear) line of sight, which should consequently preferably be free of obstructing objects in order to allow the impingement of the liquid jet. Effects due to the gravity acting during the spraying or else due to an entraining air flow in the interior are, however, conceivable and are also included. In this case, there need not be a direct line of sight, this effect rather being secondary because of the preferably small dimensioning of the apparatus.

According to alternative aspects, the opening or nozzle may also be aligned at an acute angle or even tangentially with respect to the outer wall or the light sources. If the opening in this case lies close to the outer wall or the light sources, the liquid jet is converted directly into a liquid film flowing rapidly along the outer wall or the light sources. The momentum imparted to the flow by the nozzle may, for example in a vertical cylinder as the interior with horizontal emission of the liquid, advantageously lead to a liquid film moving downward in a spiral on the outer wall.

The basic concept thus consists in directing the liquid to be sterilized in the manner of a sprinkler apparatus from the interior onto an opposite surface, i.e. the outer wall of the interior, this surface being irradiated from the rear side, i.e. from outside the outer wall of the interior, with UV light or UV-C radiation, and thereby being sterilized. For example, the effect of inactivating the germs as is described in detail in the introduction to the description therefore occurs. A thin film of the liquid is formed on the outer wall with a layer thickness which is so thin because of the downward flow of the liquid due to gravity that even with a high degree of pollution complete radiation may still take place through it with a sufficiently high transmission for the germ inactivation even on the surface of the film (toward the inside of the container).

The small penetration depth of the UV radiation in more strongly contaminated liquids, for example wastewater, washing water and/or turbid liquids, for example suspensions or emulsions, in particular milk, fruit juices, blood or the like, may consequently be transformed with the aid of the proposed solution from a three-dimensional problem into a quasi-two-dimensional problem.

In comparison with the prior art, which as described also already recognizes in principle a reduction of layer thicknesses with the aid of such a transformation into a quasi-two-dimensional problem, in addition effects are nevertheless also achieved by the proposed solution, however. On the one hand, this relates to the possibility of providing the UV reactor in a closed and compact design. Since the outer wall with the liquid is irradiated from outside, the interior may also be used for the inlet with the opening without widening of the interior having to be carried out in comparison with a conventional flow reactor. The inlet with an opening could, according to exemplary embodiments, in a simple case even be formed merely in such a part of the outer wall of the interior itself that lies opposite that part of the outer wall which lies opposite the impingement region according to the proposed solution. This means that the jet is directed from an outer wall (in which the inlet with the opening is located) onto the opposite outer wall (behind which or in the vicinity of which the at least one light source is located). If a plurality of openings are provided, these could even be constructed mirror-symmetrically, i.e. both opposite outer walls spray and are sprayed.

Particularly advantageous embodiments, however, provide the placement of the inlet in the interior in order to use the surface of the outer wall optimally, i.e. in order to achieve an area which is as large as possible, which allows a higher throughput. These will be described in more detail below.

At any rate, the proposed solution allows a uniform and homogeneous distribution of the liquid over the surface of the outer wall of the interior. At the same time, however, the flow rate is thus also adjustable over a large range.

Furthermore, the proposed solution is also particularly suitable, according to one refinement, to be combined with UV-C LEDs as light sources, since these may be arranged in a manner distributed close to one another over the installation space and homogeneous irradiation of the wide surface of the outer walls is thereby made possible.

A further advantage derives from the fact that a focused liquid jet can achieve an abrasive effect on the outer wall. The formation of biofilms may thereby be effectively prevented or at least reduced. Since the UV reactor is preferably closed by the container, an advantageous self-cleaning effect is thereby created. Precautions for maintenance, for instance separate wiper blades or other wearing parts, may be omitted, which can once more reduce the installation space and extend the overall operating time, and can reduce the costs.

By the abrasive effect, gentle removal of not only biofilms but also other buildups on the reactor walls is also possible. This relates for example to precipitated minerals such as calcium. The risk of scratches, groove formations or roughening on the outer walls, which may in turn be conducive to the formation of biofilms, is thereby avoided or at least reduced.

Advantageously, the proposed solution may also be integrated as additional component into existing UV disinfection systems.

According to a further refinement of the apparatus for sterilizing a liquid, the inlet comprises a supply line at least partially guided through the interior, the at least one opening being formed in the supply line. The supply line allows suitable placement of the at least one opening or nozzle in the interior, so that it can occupy a position with the principal jet direction toward the outer wall. The supply line itself may also be adapted to be movable, for instance for cleaning or maintenance purposes or else in order to move the nozzles or openings during operation, or in order to set different operating modes. It may thus be possible, for example as a function of the jet pressure, to occupy a different position in order to achieve an optimal drop distribution in the interior and on the outer wall.

According to a further refinement of the apparatus for sterilizing a liquid, the interior, or its outer wall, comprises a section which has a midaxis. This section could, for example, preferably be configured cylindrically. Conical or frustoconical sections, or parallelepipeds with a polygonal cross section, may also likewise be envisioned. Furthermore, for example, sections with an elliptical cross section or in the form of a sphere or a hemisphere may also be considered. In principle, the invention is not restricted to particular shapes for the section.

According to a further refinement of the apparatus for sterilizing a liquid, the supply line extends substantially along or at a distance parallel to the midaxis of the section.

According to a further refinement of the apparatus for sterilizing a liquid, a multiplicity of openings are provided in the supply line. In this way, by suitable guiding of the supply line through the interior, it is possible to achieve an ideal distribution of the openings or nozzles as well as of the principal jet directions, particularly for example in respect of homogeneous spraying of the outer wall in the region of the radiation sources. The multiplicity of openings in the supply line may in this case be arranged in a direction along the midaxis. As an alternative or in addition, the multiplicity of openings in the supply line may be arranged in an azimuthal direction with respect to the midaxis.

According to a further refinement of the apparatus for sterilizing a liquid, the at least one opening is respectively adapted to direct a focused liquid jet onto the outer wall. As described, in this way inter alia controlled local formation of the liquid film may be achieved. Furthermore, an abrasive effect on the outer wall is possible.

According to a further refinement of the apparatus for sterilizing a liquid, the supply line or at least one section thereof, which comprises the at least one opening, is configured to be movable. In the case of the section of the interior with the midaxis, the supply line or its section may in particular be adapted to be rotatable about the midaxis (or about an arbitrary axis substantially parallel thereto if the supply line is positioned in decentered fashion, i.e. off-center), in order to reorientate a principal jet direction of the liquid jet, in which case a separate apparatus for moving the supply line or the section, which drives the movement, in particular a rotation, may in particular be provided. Such an apparatus may, for example, comprise a motor which drives the movement under electronic control. As an alternative or in addition, the apparatus may however also be formed from a mechanical arrangement which draws the drive for the movement from the liquid pressure, i.e. it passively converts the liquid flow into a rotational movement of the supply line or its section comprising the at least one opening.

The invention was in this case based on the idea of using sprinkler installations known from the practice of horticulture in miniaturized fashion in UV-C reactors. It has been found that this implementation is thoroughly feasible and functional. To this end, for example, various types of apparatuses may be considered: gear drive sprinklers, impact sprinklers or square sprinklers.

In the case of the gear drive sprinkler, for example, the pressure in the supply line is responsible for putting the gear installed in the interior of the apparatus in motion. This gear ensures that the section of the supply line is set in rotation. Normally, the liquid jet may thereby be distributed over a 360 degree radius. The section, for example formed as a rotatable head, may thus rotate arbitrarily often about its own axis. It is, however, also possible to set only a particular circle segment so that the gear moves the head to and fro.

In the case of the impact sprinkler, for example, the head (i.e. the rotatable section of the supply line) is freely rotatable without gear. For this purpose, a spring-prestressed jet spreader is set up on the head and is driven to and fro by the liquid jet, or swings out from the jet direction and back into it (so-called reciprocating movements), in each case taking with it an (angular) momentum due to the jet deflection and thus rotating the head in stages. By optional so-called sector limiters, it may also be made possible in this case to avoid a full circle and to return the head to a starting position, the sector limiters mechanically switching a flow onto the jet spreader so that the return to the starting position can take place very rapidly.

In the case of the rectangular or square sprinkler, a larger section of the supply line rotates about its own axis, but oscillates between interval limits.

According to a further refinement of the apparatus for sterilizing a liquid, it comprises a deflecting element which is provided in or at the at least one opening and is adapted to deflect a principal jet direction of the liquid jet in the interior. In this way, the opening or nozzle may be set up fixed while only the deflecting element is set up movably but instead ensures the distribution of the liquid jet in the interior.

According to a further refinement of the apparatus for sterilizing a liquid, it comprises an apparatus for adjusting the pressure of the liquid in the supply line before the at least one opening, the apparatus being adapted to adjust the strength of the liquid jet.

According to a further refinement of the apparatus for sterilizing a liquid, the apparatus for adjusting the pressure of the liquid in the supply line is adapted to generate a pulsating liquid jet.

According to a further refinement of the apparatus for sterilizing a liquid, it comprises an apparatus for adjusting a nozzle, which is adapted, if the at least one opening is a nozzle, selectively to adjust a spatially fanned-out liquid jet with a comparatively large aperture angle or a strongly focused liquid jet with a comparatively small aperture angle.

According to a further refinement of the apparatus for sterilizing a liquid, it comprises a sensor which is configured to register a turbidity of the liquid that has flowed down on the outer wall in the container. It may furthermore comprise a control apparatus which is connected to the sensor and selectively to the apparatus for adjusting the pressure of the liquid in the supply line, to the apparatus for adjusting the nozzle and/or to the movable section and which is configured to correspondingly adjust the pressure in the supply line, the aperture angle of the liquid jet or the principal jet direction as a function of the registered turbidity of the liquid.

Further advantages, features and details of the invention are evident from the claims, the following description of preferred embodiments and with the aid of the drawings. In the figures, references which are the same denote features and functions which are the same.

BRIEF DESCRIPTION OF THE DRAWING(S)

In the following description of preferred exemplary embodiments, it should be taken into account that the present disclosure of the various aspects is not restricted to the details of the construction and the arrangement of the components as are presented in the following description and in the figures. The exemplary embodiments may be implemented or carried out in a variety of ways in practice. It should furthermore be taken into account that the expressions and terminology employed here are used merely for the purpose of specific description and they should not be interpreted restrictively by the person skilled in the art per se.

Figure 1:
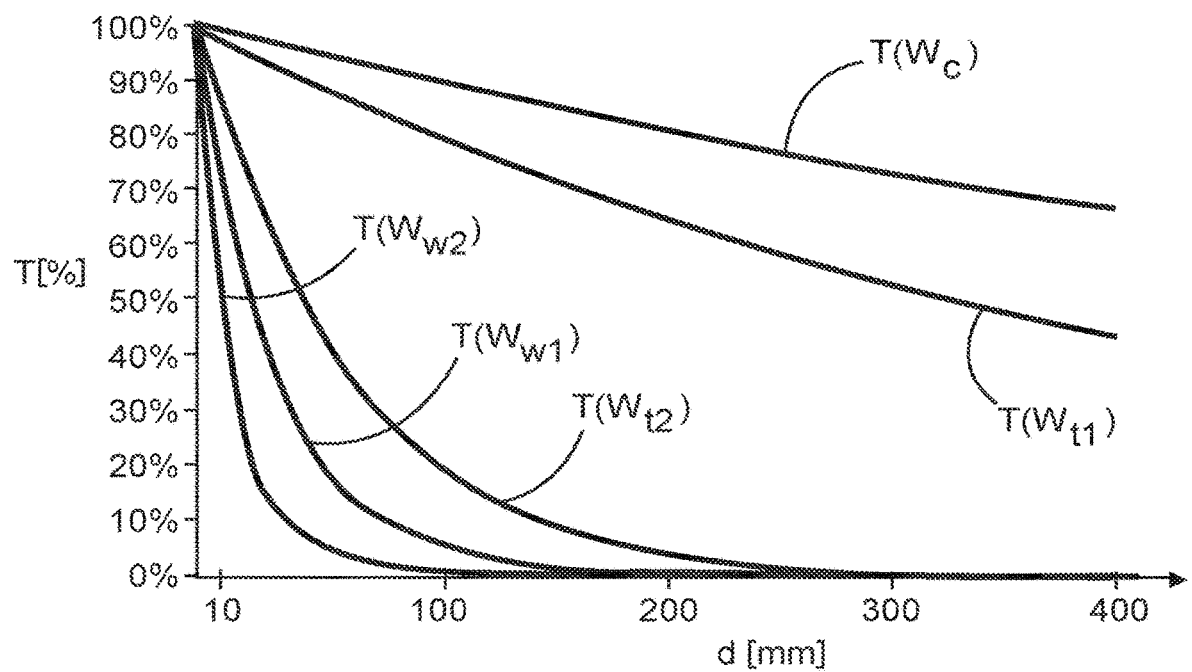
FIG. 1 shows a diagram of the spectral UV-C transmission T [in %] at a wavelength of 254 nm in water as a function of the layer thickness d [in mm], specifically for ultrapure water (SSK254 at d=10 mm: 99%), drinking water (SSK254 at d=10 mm: 98%), drinking water (SSK254 at d=10 mm: 85%), wastewater (SSK254 at d=10 mm: 75%), and wastewater (SSK254 at d=10 mm: 50%)

First, FIG. 1 illustrates in a diagram the influence of a reduction in the transmission as a function of the layer thickness due to turbidity or pollution with various water qualities. The spectral UV-C transmission T [in %] is shown at a wavelength of 254 nm conventionally used for this purpose in water as a function of the layer thickness d [in mm], specifically for ultrapure water (curve T(Wc): SSK254 at d=10 mm: 99%), drinking water (curve T(Wt1): SSK254 at d=10 mm: 98%), drinking water (curve T(Wt2): SSK254 at d=10 mm: 85%), wastewater (curve T(Ww1): SSK254 at d=10 mm: 75%), and wastewater (curve W(w2): SSK254 at d=10 mm: 50%).

As may be seen, ultrapure water absorbs the irradiated UV-C light comparatively weakly. However, the wavelength-dependent radiation absorption is greatly influenced because of compounds dissolved in the water as well as by undissolved substances, as may be seen clearly in FIG. 1 from the curves for drinking water and wastewater. The extent of the UV-C absorption is consequently correlated with the water quality. The attenuation of the radiation as a function of the layer thickness is determined by an optical measurement and may be expressed as a spectral attenuation coefficient SSK. For example, 10 mm may be taken as a reference layer thickness. Measurement values for the attenuation coefficient are often used in the scope of sterilization and water treatment. In particular, the special coefficient SSK254 is determined without prior filtration at the wavelength 254 nm, so that substances causing turbidity and particles are also jointly registered with this coefficient. The measurement value is therefore increased in comparison with other coefficients (for example SAK), but precisely this coefficient is practically relevant in reactors because it is the extent of the actual radiation through the liquid for a given total layer thickness which is important.

For an exemplary application of the embodiments described below in dishwashers or washing machines, in FIG. 1 the two curves T(w1) and T(w2) are relevant for wastewater, especially the curve for more strongly polluted wastewater T(w2). They show that even with layer thicknesses of 5 mm, only 10% of the initial intensity of the UV-C radiation remains.

Figure 2A:
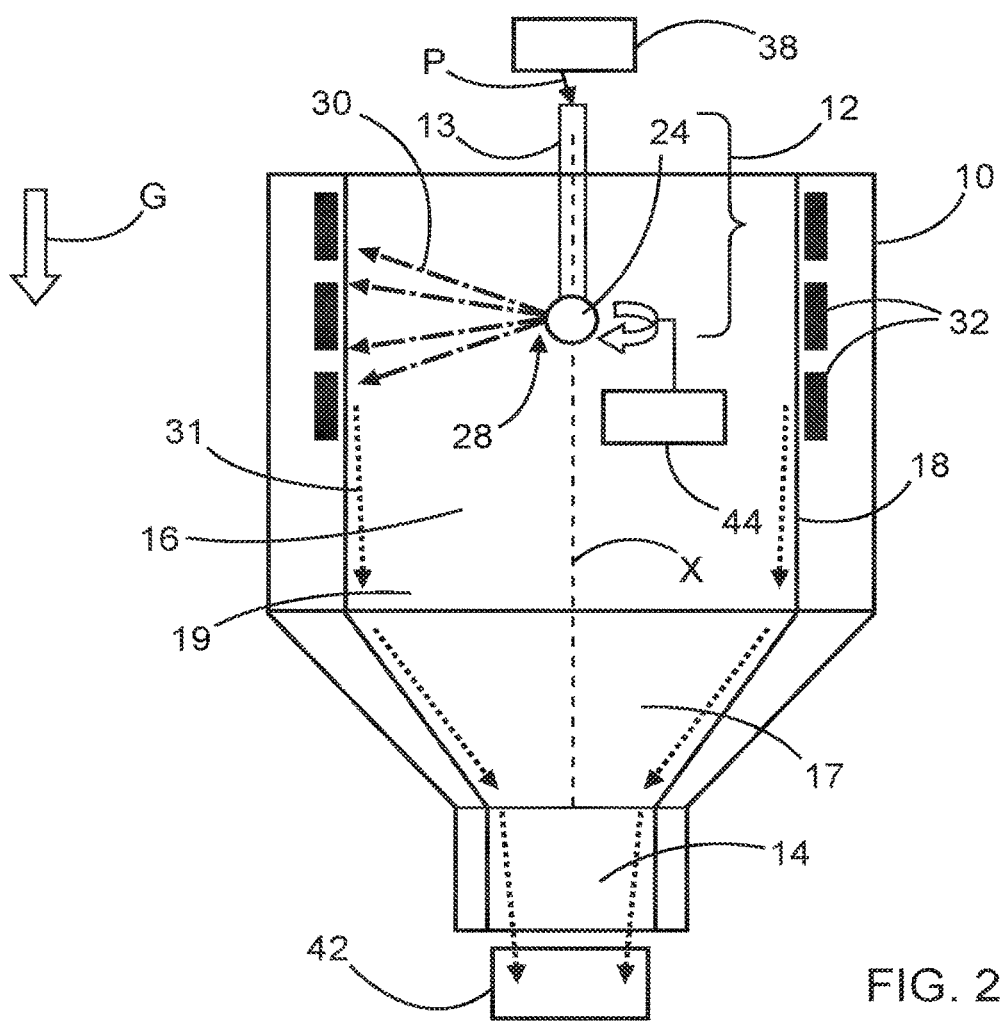
FIG. 2A shows a vertical UV-C reactor according to a first embodiment in a schematic cross-sectional view from the side.
Figure 2B:
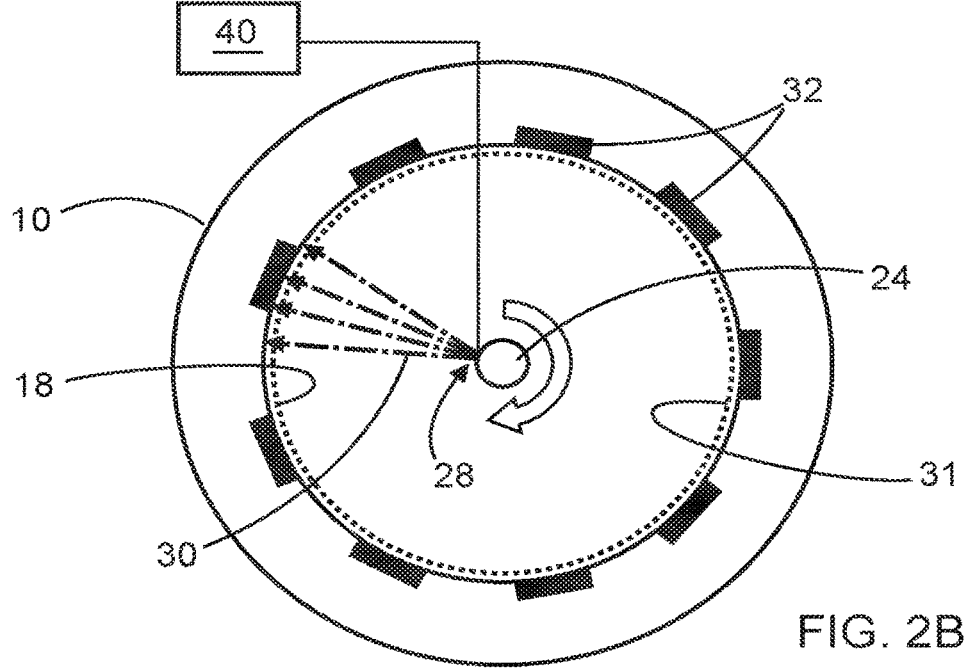
FIG. 2B shows the vertical UV-C reactor of FIG. 2A in a schematic cross-sectional view from above.

A first embodiment of an apparatus for sterilizing a liquid is shown in FIGS. 2A and 2B. The apparatus comprises a container 10 having an inlet 12, an outlet 14 and an interior 16 with an outer wall 18. The interior 16 comprises an upper cylindrical section 19 and a lower conical or funnel-shaped section 17, which tapers from the cylindrical section to the outlet 14. The cylindrical section and the conical section form a section with a common midaxis X. The midaxis X extends parallel to the force of gravity G in this particular exemplary embodiment. The outer wall 18 may be formed to be transparent entirely or only in the region of a number of light sources 32, in this exemplary embodiment of UV-C LEDs. In particular, it is transmissive for the radiation emitted by the UV-C LEDs. The UV-C LEDs may, for example, emit radiation with a wavelength of 265 nm and the respective power may be from 50 to 100 mW.

As may be seen by viewing FIGS. 2A and 2B together, the light sources 32 are arranged in 3 groups respectively of 9 LEDs. The UV LEDs are in this case distributed at equal distances from one another around the midaxis X on (or behind) the outer wall 18 and emit their radiation with a principal beam direction onto the midaxis X. The three groups of light sources 32 are in turn arranged at equal distances from one another along the midaxis X in the region of the cylindrical section. In this exemplary embodiment as in others too, more or fewer LEDs may also be provided in the rows, the number of rows may likewise be varied, and the LEDs may also emit radiation with a different wavelength in order to achieve supplementary effects. The power supply and the control of the LEDs are not depicted in the figures for the sake of simple representation.

The inlet 12 in the exemplary embodiment shown in FIGS. 2A and 2B is formed by a supply line 13, which is provided as a rotatable tube with a section 24 at the distal end in which an opening 28 is set up, through which the liquid to be sterilized is admitted into the interior 16. In particular, the opening 28 may be configured as a nozzle. The opening 28, or the nozzle, is aligned onto the outer wall 18, i.e. it has for example a flow axis which is transverse to the midaxis X of the interior 16 and is preferably perpendicular thereto. In particular, the flow axis is directed onto the outer wall 18, specifically onto a region of the outer wall 18 in which the UV-C light sources 32 are arranged. The light sources 32 therefore lie opposite the opening 28, or nozzle. A plurality of such openings 28 or nozzles may also be set up in the section 24.

The supply line 13 extends substantially along the midaxis X of the cylindrical section 19. As described, the supply line or else only a limited section 24 with the nozzle head, in particular a front section 24 as illustrated in FIG. 2A, may be adapted to be rotatable at least in this section 19, the rotation axis coinciding with the midaxis X as schematically indicated in FIG. 2A. Likewise schematically indicated is an apparatus 44 for moving the supply line 13 with the section 24 at its distal end. Other than implied in FIG. 2A, the apparatus 44 may also be arranged outside the interior 16. The apparatus may be connected to the power supply (not shown) in order to drive the rotation of the supply line 13, or of the section 24 with the opening 28, about the midaxis X. It is, however, also possible for the rotation to be driven from the flow pressure of the liquid flowing through and for the apparatus 44 merely to convert the forces into rotation, as is known for example from the mechanism of conventional sprinkler and (garden) watering installations.

As is represented in FIGS. 2A and 2B, the opening 28, or the nozzle, is configured to direct a liquid jet 30 onto the outer wall 18. This may impinge on the outer wall 18 as a focused or fanned-out jet and can flow down thereon as a thin liquid film 31 past the respective light source 32, i.e. driven by gravity, in the direction of the outlet 14. As an alternative or in addition, the nozzle may project the liquid as a finely distributed spray mist and thereby fill a volume adjacent to the region in which the light sources 32 are arranged. The UV-C LEDs therefore irradiate the liquid film traveling past, which has a thickness much less than the penetration depth of the UV-C radiation, or a multiplicity of very fine droplets, the penetration depth also being sufficient here so that effective sterilization can take place.

A sharply focused jet may furthermore be generated by the nozzle, which in respect of germs accumulating on the outer wall with possible formation of biofilms may achieve a mechanically abrasive effect so that the germs or biofilms may be removed and possibly the latter may be prevented from being created at all. In order to generate a corresponding pressure in the liquid—as schematically represented in FIG. 2A—an apparatus 38 for adjusting the pressure of the liquid in the supply line 13 may be provided before the opening or openings 28 in the flow direction. The apparatus 38 may, for example, be constructed in the manner of a pump. The apparatus is in this case configured to adjust the strength of the liquid jet 30 indirectly by adjusting the pressure. The apparatus 38 for adjusting the pressure of the liquid in the supply line 13 may be controlled by the control apparatus described above or another control apparatus (likewise not represented). In this case, an operating mode in which a pulsating liquid jet 30 is generated may be provided. This may further improve the abrasive effect on the outer wall 18.

It should be noted that, in the exemplary embodiment shown in FIGS. 2A and 2B, a plurality of nozzles may be set up in the azimuthal direction on the distal section. Optionally, the supply line 13 may also be adapted to be displaceable in the direction of the midaxis X in order to be able to sweep over and abrasively treat different sections and regions of the interior 16. A plurality of sections 24 respectively having one or more nozzles may also be provided. Furthermore, the sections 24 may also be adapted to be rotatable relative to the supply line 13, which is itself then installed fixed, i.e. does not need to be rotatable.

According to a further refinement of the apparatus for sterilizing a liquid as shown in FIGS. 2A and 2B, referring to FIG. 5, the apparatus further comprises a deflecting element 29 which is provided in or at the at least one opening 28 and is adapted to deflect a principal jet direction of the liquid jet 30 in the interior 16. In this way, the opening 28 or nozzle may be set up fixed while only the deflecting element 29 is set up movably but instead ensures the distribution of the liquid jet 30 in the interior 16.

A second embodiment of an apparatus for sterilizing a liquid is shown in FIGS. 3A and 3B. FIG. 3A shows in particular a horizontal UV-C reactor for sterilizing a liquid in a side view, while FIG. 3B shows the horizontal UV-C reactor of FIG. 3A in a schematic cross-sectional view from the end side. Similarly as in the first embodiment, the apparatus comprises a container 10 having an inlet 12 with a supply line 13, an outlet 14 and an interior 16 with an outer wall 18. Other than in the first embodiment, the interior 16 or a cylindrical section 19 with a midaxis X is formed almost flat, i.e. the midaxis X is almost perpendicular to the direction of gravity, see FIG. 3A. However, a slight inclination of the midaxis X relative to a horizontal direction remains here in order to allow a downward flow of the sprayed liquid (see the liquid 31*a* flowing down in FIG. 3A). A funnel-shaped section 17 forms the transition to a vertically aligned outlet 14, to which it tapers.

In other regards, the structure is very similar as in the first embodiment. Light sources 32 are positioned in 11 groups of UV-C LEDs arranged in rows of 9 each annularly around the midaxis X on the outer wall 18. The groups are arranged at equal distances from one another along the midaxis X. The supply line 13 also extends along the midaxis here, although it may also be arranged offset relative thereto, for example by a slight offset in the upward vertical direction, since for example an upwardly directed jet must act against the force of gravity and the jet force is therefore slightly reduced here.

On the other hand, the flat arrangement of the cylindrical section 19 of the interior leads to an accumulation of liquid 31a flowing down on the lower side of the cylinder (see FIG. 3B), where an abrasion effect is consequently more difficult to achieve. It is, however, also possible to compensate for this by the offset of the supply line 13 taking place precisely for this reason in the vertical direction downward in order to impact the liquid flowing down with a sharp and stronger (since it is close) jet and therefore to prevent biofilms from forming.

In the second embodiment, a plurality of (in the schematic representation: five) rotatable sections 24 are shown, which are set up along the midaxis in the supply line 13 at equal distances. More or fewer rotatable sections 24 may also be provided. As in the first embodiment, openings 28 or nozzles directed onto the outer wall are provided therein, which direct the liquid to be sterilized as a liquid jet 30 onto the outer wall 18, on which it flows downward in the circumferential direction (see FIG. 3B), collects there and then flows down in the axial direction (parallel to the midaxis X) to the funnel-shaped section 17 and from there in the outlet 14. The sections 24 may be firmly connected to the supply line 13 and be rotatable together therewith or may be adapted to be rotatable individually and separately relative to the supply line 13. An apparatus 44 for moving the supply line 13 and/or the sections 24 may be provided, as described in the first embodiment.

In respect of an apparatus 38 for adjusting the pressure of the liquid in the supply line 13, which is also optionally provided in the second embodiment, reference may be made to the comments relating to the first embodiment.

A multiplicity of modifications and variations of the exemplary embodiments above are possible so long as the scope defined in the appended claims is not departed from. For instance, the multiplicity of openings 28 or nozzles in the supply line 13 may be arranged in an azimuthal direction with respect to the midaxis (X). If the density of the arrangement of the nozzles is sufficient so that the opposite outer wall 18 is sprayed or is irradiated (liquid jet 30) comprehensively with the liquid to be sterilized in the region of the UV-C LEDs, and this also takes place with a sufficient strength, the rotatability of the supply line 13 and/or sections 24 may readily be omitted. It is also possible to spray only neuralgic regions in a static, non-rotatable arrangement of the openings 28 or nozzles. Full abrasion of the outer wall is not absolutely necessary.

Furthermore, an apparatus 40 for adjusting one or more nozzles may be provided in addition, which is adapted to selectively set up a spatially fanned-out liquid jet 30 with a comparatively large aperture angle or a strongly focused liquid jet 30 with a comparatively small aperture angle. This applies for both embodiments shown.

In addition, a sensor 42 which is configured to register a turbidity or a fluorescence of the liquid, which has flowed down on the outer wall, in the container 10 may be provided. A control apparatus 50 (represented only in FIG. 4) may advantageously be provided for this purpose, which is connected to the sensor 42, to the apparatus 38 for adjusting the pressure of the liquid in the supply line, to the apparatus 40 for adjusting the nozzle and/or the movable section, and which is configured to correspondingly adjust the pressure in the supply line 13, the aperture angle of the liquid jet 30 or the principal jet direction or the rotational speed as a function of the registered turbidity of the liquid.

Figure 3A:
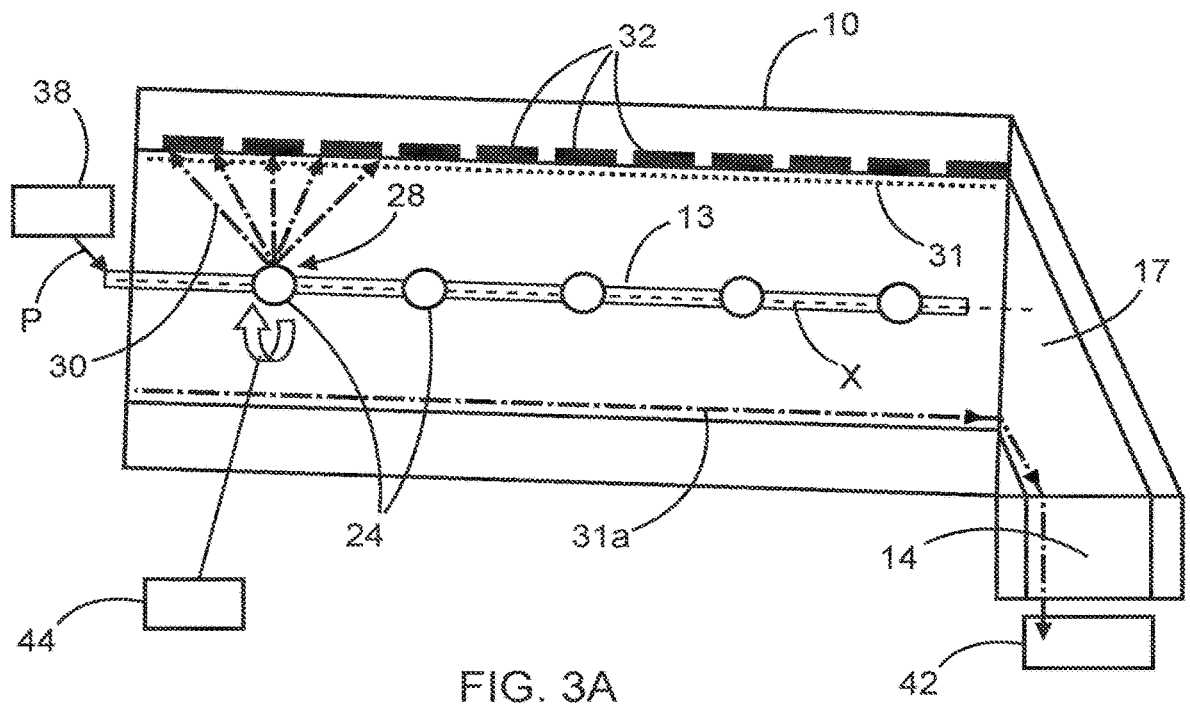
FIG. 3A shows a horizontal UV-C reactor according to a second embodiment in a schematic cross-sectional view from the side.
Figure 3B:
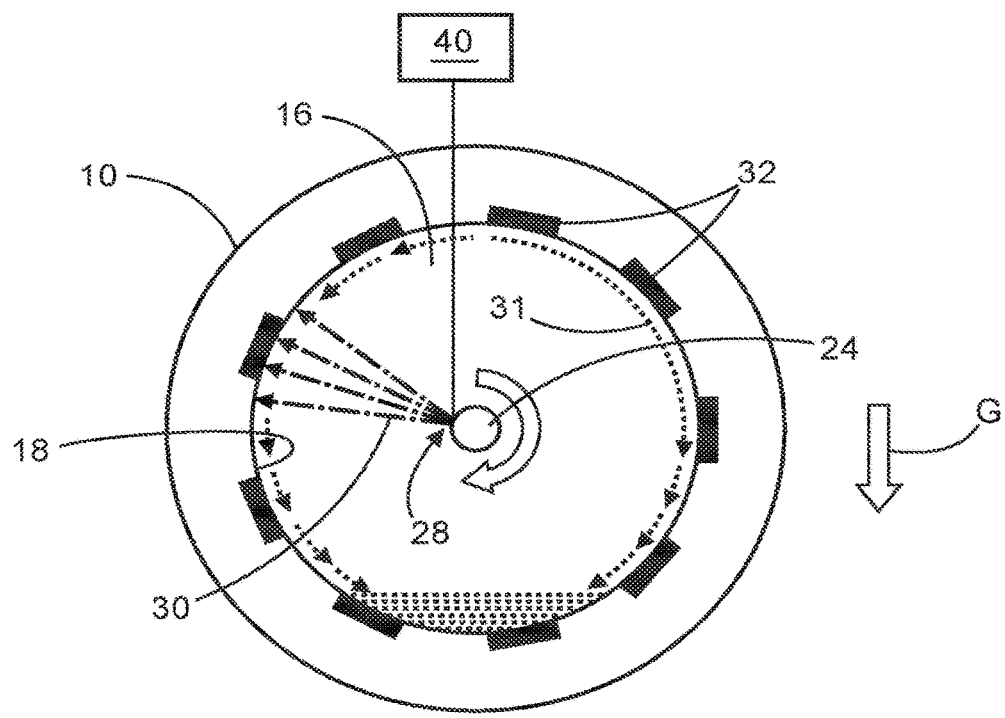
FIG. 3B shows the horizontal UV-C reactor of FIG. 3A in a schematic cross-sectional view from the end side.
Figure 4:
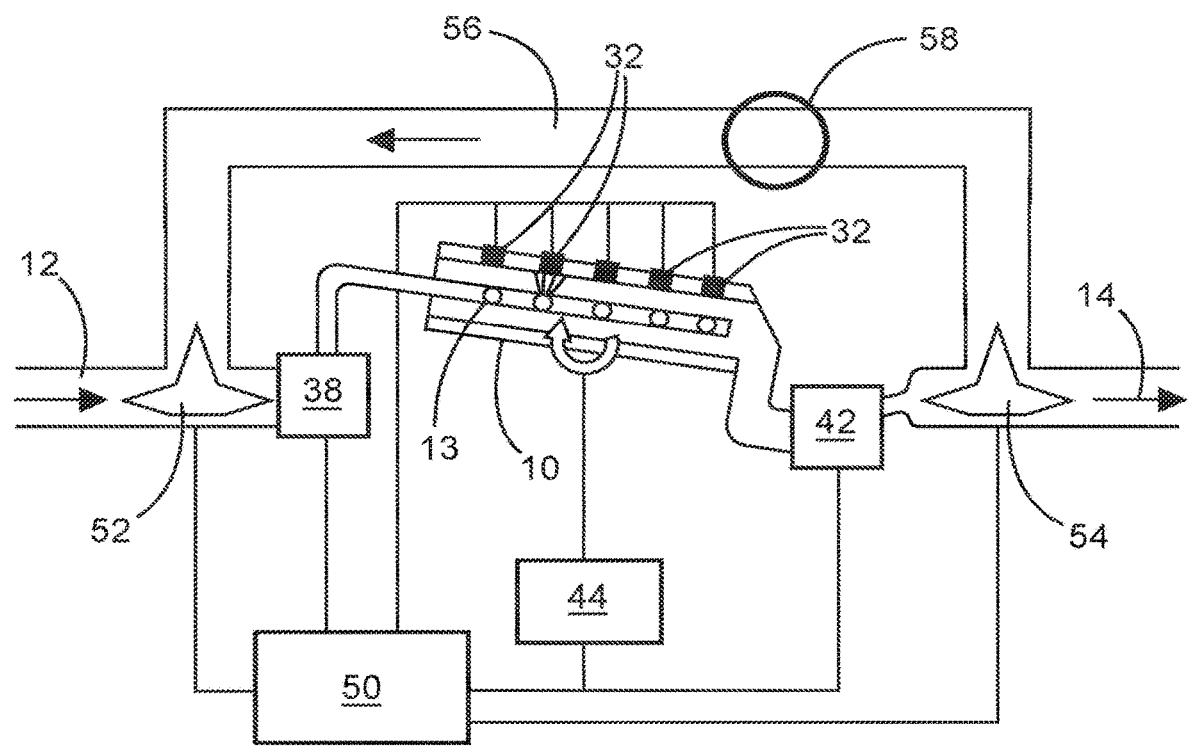
FIG. 4 shows a schematic representation of a further exemplary embodiment, for example based on the first or second embodiment, with the possibility of feedback of the disinfected liquid and a corresponding control apparatus.
Figure 5:
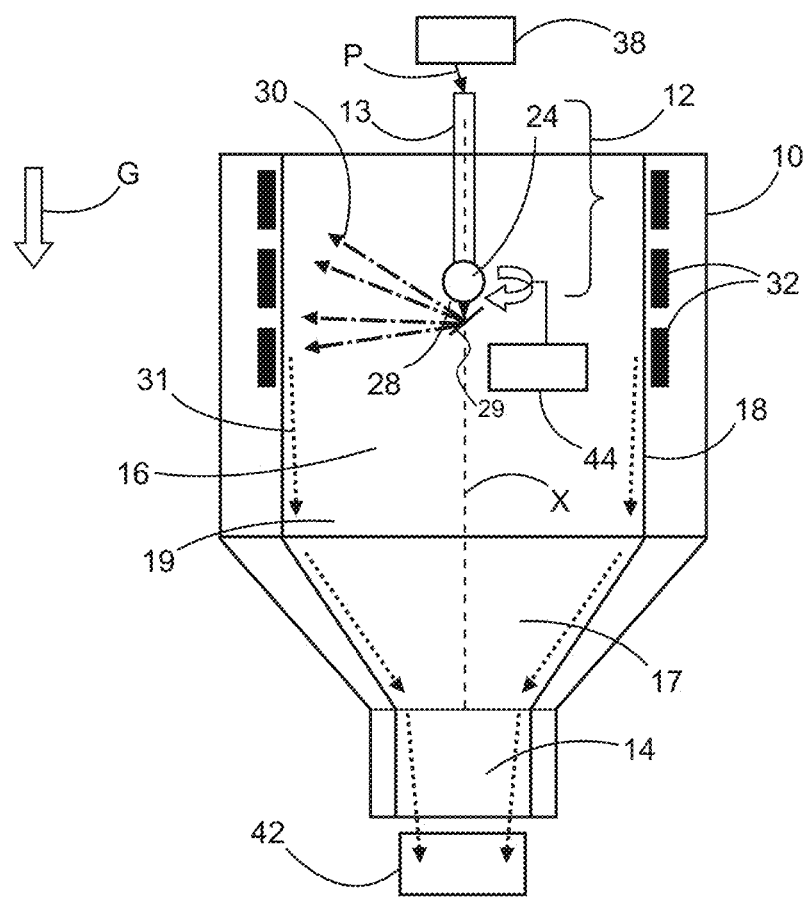
FIG. 5 shows another embodiment of a vertical UV-C reactor in a schematic cross-sectional view from the side, similar to FIG. 2A but including a deflecting element.

FIG. 4 shows a further exemplary embodiment, with the aid of which possible feedback and repeated UV disinfection of the liquid may be carried out in order to further increase the quality of the sterilization. The container 10, shown in FIG. 4, of an apparatus for sterilizing a liquid may, with the features it contains, including the inlet 12 and the outlet 14, correspond substantially to the exemplary embodiments of FIGS. 2A and 2B or 3A and 3B. One particular feature here is a return line 56, which leads back from the outlet 14 to the inlet 12. This return line 56 allows batchwise operation. At the points of connection respectively to the inlet 12 and the outlet 14, the return line 56 branches off and is in this case controlled by 3-way valves 52, 54. In the return line 56, there may optionally be a pump 58 which drives the return flow. As an alternative, the pump 58 may also be positioned in the outlet 14 before the 3-way valve 54 in the flow direction, in which case the same pump may then be used for the return flow as well as for the through-flow operation (i.e. for pumping from the reactor).

The 3-way valves 52, 54 may be controlled by a control device 50 which also controls the apparatus 38, shown in FIG. 2A or 3A, for adjusting the pressure of the liquid in the supply line 13, the apparatus 44 for moving the supply line or the rotatable section thereof, the measurement with the sensor 42, and/or the apparatus 40 for adjusting the nozzle and/or the movable section. The control device 50 may also be connected to the pump 58 in order to maintain the return flow depending on a measurement result by the sensor 42 (for example transmission measurement or particularly also fluorescence measurement) until a desired measurement result is obtained, after which the 3-way valves 52, 54 are switched to through-flow. The position of the sensor 42 may also lie in the interior in the case of the fluorescence measurement, since the UV-C LEDs can deliver the necessary fluorescence excitation here. By fluorescence excitation (for example by the UV-C radiation source) and a sensor 42 sensitive in the UV-A, UV-B and/or visible range, the amount and possibly the nature of the contamination present may be deduced. In order to avoid erroneous measurements, the sensor 42 may be filtered in respect of the excitation light source so that the exciting UV-C radiation is thus not transmitted but is preferably reflected. The control device 50 may furthermore control the UV-C light sources 32 as well.

LIST OF REFERENCES 10 container
12 inlet
13 supply line
14 outlet
16 interior
17 funnel-shaped section of the interior
18 outer wall of the interior
19 cylindrical section of the interior
24 rotatable selection of the supply line
28 opening for liquid jet, nozzle
30 liquid jet
31 liquid film flowing down
32 light sources, UV-C LEDs 38 apparatus for adjusting the pressure of the liquid in the supply line
40 apparatus for adjusting the opening/nozzle
42 fluorescence or turbidity sensor
44 apparatus for moving the supply line or the rotatable section thereof
50 control apparatus
52, 54 3-way valves
56 return line
58 pump
G gravity
P pressure generated in the liquid
X midaxis (cylindrical interior)

The invention claimed is:

1. An apparatus for sterilizing a liquid, comprising:
a container having an inlet, an outlet and an interior with an outer wall;
at least one light source which is adapted to emit radiation in an ultraviolet wavelength range, in particular UV-C radiation, through the outer wall or from a position on the outer wall into the interior;
wherein the inlet comprises a supply line with at least one opening formed in the supply line, wherein the at least one opening is respectively formed as a nozzle, which is positioned and aligned in relation to the outer wall of the interior and the at least one light source in order, when a pressure is exerted on the liquid to be admitted through the at least one opening and to be sterilized, to form a liquid jet directed onto the outer wall in a region of the at least one light source and/or above the at least one light source.

2. The apparatus as claimed in claim 1, wherein the at least one opening is configured to form the liquid jet directed onto the outer wall in such a way that
it can impinge on the outer wall as a focused or fanned-out jet and can flow down thereon as a thin liquid film in front of the at least one light source, or
as a finely distributed spray mist it fills a volume adjacent to the region of the at least one light source.

3. The apparatus as claimed in claim 1, wherein the supply line is at least partially guided through the interior.

4. The apparatus as claimed in claim 3, wherein the interior, or its outer wall, comprises a section which has a midaxis.

5. The apparatus as claimed in claim 4, wherein the supply line extends substantially along or at a distance parallel to the midaxis of the section.

6. The apparatus as claimed in claim 3, wherein a multiplicity of openings are provided in the supply line.

7. The apparatus as claimed in claim 6, wherein the multiplicity of openings in the supply line are arranged in a direction along the midaxis.

8. The apparatus as claimed in claim 6, wherein the multiplicity of openings in the supply line are arranged in an azimuthal direction with respect to the midaxis.

9. The apparatus as claimed in one of claim 3, wherein the at least one opening is respectively adapted to direct a focused liquid jet onto the outer wall.

10. The apparatus as claimed in one of claim 3, wherein the supply line or at least one section thereof, which comprises the at least one opening, is adapted to be movable, in case of a section of the interior in particular rotatable about the midaxis, in order to reorientate a principal jet direction of the liquid jet,
in which case an apparatus for moving the supply line or the section thereof, which drives movement, in particular a rotation, may be provided in particular.

11. The apparatus as claimed in claim 3, furthermore comprising
a deflecting element which is provided in or at the at least one opening and is adapted to deflect a principal jet direction of the liquid jet in the interior.

12. The apparatus as claimed in claim 1, furthermore comprising
an apparatus for adjusting the pressure of the liquid in a supply line before the at least one opening, the apparatus being adapted to adjust the strength of the liquid jet.

13. The apparatus as claimed in claim 12, wherein the apparatus for adjusting the pressure of the liquid in the supply line is adapted to generate a pulsating liquid jet.

14. The apparatus as claimed in claim 1,
wherein the at least one opening is a nozzle, furthermore comprising
an apparatus for adjusting the nozzle, which is adapted to selectively adjust
a spatially fanned-out liquid jet with a comparatively large aperture angle.

15. The apparatus as claimed in claim 1, furthermore comprising:
a sensor which is configured to register a turbidity of a liquid that has flowed down on the outer wall in the container, and
a control apparatus which is connected to the sensor and selectively to the apparatus for adjusting the pressure of the liquid in a supply line, to the apparatus for adjusting a nozzle and/or to a movable section and which is configured to correspondingly adjust the pressure in the supply line, an aperture angle of the liquid jet or a principal jet direction of the liquid jet or a rotational speed of the liquid jet as a function of the registered turbidity of the liquid.

16. The apparatus as claimed in claim 1, wherein the at least one light source is an LED emitting radiation in the ultraviolet wavelength range, in particular UV-C radiation.

17. The apparatus as claimed in claim 1, wherein the liquid jet forms a liquid film in a region of the at least on light source and/or above the at least one light source.

18. The apparatus as claimed in claim 1,
wherein the at least one opening is a nozzle, furthermore comprising
an apparatus for adjusting the nozzle, which is adapted to selectively adjust
a strongly focused liquid jet with a comparatively small aperture angle.

* * * * *